US006915294B1

(12) United States Patent
Singh et al.

(10) Patent No.: US 6,915,294 B1
(45) Date of Patent: Jul. 5, 2005

(54) METHOD AND APPARATUS FOR SEARCHING NETWORK RESOURCES

(75) Inventors: Jaswinder Pal Singh, New York, NY (US); Randolph Wang, Princeton, NJ (US)

(73) Assignee: firstRain, Inc., New York, NY (US)

( * ) Notice: Subject to any disclaimer, the term of this patent is extended or adjusted under 35 U.S.C. 154(b) by 416 days.

(21) Appl. No.: 09/935,782

(22) Filed: Aug. 22, 2001

Related U.S. Application Data

(63) Continuation-in-part of application No. 09/933,888, filed on Aug. 20, 2001, and a continuation-in-part of application No. 09/933,885, filed on Aug. 20, 2001.
(60) Provisional application No. 60/227,875, filed on Aug. 25, 2000, provisional application No. 60/227,125, filed on Aug. 22, 2000, and provisional application No. 60/226,479, filed on Aug. 18, 2000.

(51) Int. Cl.$^7$ .......................... G06F 7/00; G06F 17/33; G06F 3/00; G06F 9/00; G06F 17/00
(52) U.S. Cl. ........................ 707/3; 707/10; 715/738
(58) Field of Search .................... 707/1, 3, 10, 102, 707/104.1; 709/219, 228; 715/738, 739, 748, 760, 968; 345/619, 440

(56) References Cited

U.S. PATENT DOCUMENTS

| | | | | |
|---|---|---|---|---|
| 5,717,914 A | * | 2/1998 | Husick et al. ................. 707/5 |
| 6,012,072 A | * | 1/2000 | Lucas et al. ................ 715/526 |
| 6,112,201 A | * | 8/2000 | Wical ........................... 707/5 |
| 6,119,124 A | | 9/2000 | Broder et al. |
| 6,125,361 A | | 9/2000 | Chakrabarti et al. |
| 6,154,213 A | * | 11/2000 | Rennison et al. .......... 715/854 |
| 6,219,833 B1 | | 4/2001 | Solomon et al. |
| 6,260,042 B1 | | 7/2001 | Curbera et al. |
| 6,314,565 B1 | | 11/2001 | Kenner et al. |
| 6,363,377 B1 | * | 3/2002 | Kravets et al. ................ 707/4 |
| 6,377,945 B1 | | 4/2002 | Risvik |
| 6,463,430 B1 | | 10/2002 | Brady et al. |
| 6,493,702 B1 | | 12/2002 | Adar et al. |

(Continued)

OTHER PUBLICATIONS

Bruce Schatz, William H. Mischo, Tomothy W. Cole, Joseph B. Hardin, and Ann P. Bishop (1996), Federating Diverse Collections of Scientific Literature, pp. 28–36.*

(Continued)

*Primary Examiner*—Safet Metjahic
*Assistant Examiner*—Merilyn Nguyen
(74) *Attorney, Agent, or Firm*—Wilson Sonsini Goodrich & Rosati

(57) ABSTRACT

The present invention pertains to the field of computer software. More specifically, the present invention relates to populating, indexing, and searching a database of fine-grained web objects or object specifications. An embodiment of the invention is directed to a method of searching resources on the web. A query is received to search for information on the web and one or more web pages and one or more subsets of one or more web pages are accessed. The subsets have been extracted from one or more web pages prior to receiving the query. The subsets are extracted responsive to one or more views. The one or more views are defined independently of the search query. The views are content-sensitive filters that specify which subparts of a web page a user is interested in. Prior to receiving the search query, the subsets are stored in a database. Responsive to the search query, at least one or more of the extracted subsets of one or more web pages stored in the database is identified. The search query is used as a criterion for identifying at least one or more of the subsets.

18 Claims, 4 Drawing Sheets

U.S. PATENT DOCUMENTS

| | | | |
|---|---|---|---|
| 6,523,036 B1 * | 2/2003 | Hickman et al. | 707/10 |
| 6,549,199 B1 * | 4/2003 | Carter et al. | 345/418 |
| 6,556,984 B1 | 4/2003 | Zien | |
| 6,560,620 B1 | 5/2003 | Ching | |
| 6,574,617 B1 * | 6/2003 | Immerman et al. | 707/1 |
| 6,598,054 B2 * | 7/2003 | Schuetze et al. | 707/103 R |
| 6,601,075 B1 | 7/2003 | Huang et al. | |
| 6,643,650 B1 * | 11/2003 | Slaughter et al. | 707/10 |
| 6,643,652 B2 * | 11/2003 | Helgeson et al. | 707/10 |
| 6,658,423 B1 | 12/2003 | Pugh et al. | |
| 6,701,318 B2 | 3/2004 | Fox et al. | |
| 6,760,902 B1 * | 7/2004 | Ott | 717/113 |
| 6,785,673 B1 * | 8/2004 | Fernandez et al. | 707/3 |
| 6,812,941 B1 * | 11/2004 | Brown et al. | 715/854 |
| 2001/0018693 A1 | 8/2001 | Jain et al. | |
| 2001/0043234 A1 | 11/2001 | Kotamarti | |
| 2001/0049675 A1 * | 12/2001 | Mandler et al. | 707/1 |
| 2001/0054009 A1 | 12/2001 | Miller et al. | |
| 2002/0135800 A1 | 9/2002 | Dutta | |
| 2002/0165717 A1 | 11/2002 | Solmer et al. | |
| 2002/0166081 A1 | 11/2002 | Richardson et al. | |
| 2002/0174147 A1 | 11/2002 | Wang et al. | |
| 2003/0130998 A1 | 7/2003 | Fox et al. | |

OTHER PUBLICATIONS

Hiroshi Tsuda, Kanji Uchino, and Kunio Matsui (1998), Work Ware: WWW-based Chronological Document Organizer, pp. 15–17.*

Hasan Davulcu, Juliana Freire, Michael Kifer, and I.V. Ramakrishnan (1999), A Layered Architecture for Querying Dynamic Web Content, pp. 491–502.*

David Babowal and Werner Joerg (1999), From Information to Knowledge: Introducing WebStract's Knowledge Engineering Approach, pp. 1525–1530.*

S. Chakrabarti et al., *Focused Crawling: A New Approach to Topic–Specific Web Resource Discovery*, Mar. 29, 1999.

Zhang, K., et al., "On the editing distance between unordered labeled trees", *Information Processing Letters*, May 25, 1992, vol. 42, pp. 133–139.

Myers, E. W., "An O(ND) Difference Algorithm and Its Variations", *Algorithmica*, Jan. 17, 1986, pp. 251–266.

Douglis, F., et al., "The AT&T Internet Difference Engine: Tracking and Viewing Changes on the Web", *World Wide Web*, Jan. 1998, vol. 1, No. 1, pp. 27–44.

Chakrabarti, S., et al., "Focused crawling: a new approach to topic–specific Web resource discovery", http://www.alamaden,ibm,com/almaden/feat/www8.

Cho, J., et al., "Efficient Crawling Through URL Ordering", http://www–db.stanford.edu/~cho/crawler/paper/.

Jon M. Kleinberg, "Authoritative Sources In a Hyperlinked Environment," www.cs.cornell.edu/home/kleinber/, printed Aug. 2, 2001, pp. 1–34.

Shasha, D. et al., "Approximate Tree Pattern Matching" Chapter 14, pp. 1–28.

Parberry, I., "Problems on Algorithms," Dept. of Computer Science, University of North Texas, Denton TX, Aug. 1994.

* cited by examiner

METHOD AND APPARATUS FOR SEARCHING NETWORK RESOURCES

CROSS REFERENCE TO RELATED APPLICATIONS

This application is a continuation-in-part of U.S. application Ser. No. 09/933,888, filed Aug. 20, 2001, and U.S. application Ser. No. 09/933,885, filed Aug. 20, 2001, which claims priority to U.S. Provisional Application No. 60/226,479, filed Aug. 18, 2000, U.S. Provisional Application No. 60/227,125, filed Aug. 22, 2000, and U.S. Provisional Application No. 60/227,875, filed Aug. 25, 2000. These applications are herein incorporated by reference.

FIELD OF THE INVENTION

The present invention pertains to the field of computer software. More specifically, the present invention relates to populating, indexing, and searching a database of fine-grained web objects or object specifications.

BACKGROUND OF THE INVENTION

A search engine is a program that helps users find relevant information on a connected set of information sources. While the information sources can be connected by any mechanism, we will assume in this document—only for the sake of providing a concrete example—that they are on the World Wide Web. Numerous web search engines exist today. In this section, we first briefly survey the state-of-art of search engine technologies. We then discuss our methods for extending existing search engine technologies for searching for fine-grained objects and related entities, as well as some example applications of such a search engine.

SUMMARY OF THE INVENTION

The present invention pertains to the construction of a search engine of fine-grained entities. Our invention addresses the three above key questions in ways that are distinct from traditional approaches:

What is the right granularity at which information is returned for a query? Our search engine method returns the most relevant object or object-related entity, instead of the most relevant page.

How do we transform existing page-granularity information into the information at the appropriate granularity? Our search engine method defines the granularity of web objects or 'clips' by leveraging entities we call views. Views, which are defined in the next section, can be applied to pages, resulting in the extraction of a finer-grained objector clip from the page. If views are not available for the relevant page or set of information, the page is automatically decomposed into objects or clips that are returned by the search engine. However, views defined by human beings they are likely to be more meaningful and aesthetically pleasing, and they and their related objects are more likely to have links pointing directly to them.

How do we rank the target information if it is not processed at page granularity? When analyzing link structures to compute relevance ranking, our search engine considers views and objects as participating components in the link structure analysis.

These features of our search engine allow it to deliver to devices content that is appropriate in all three dimensions: granularity, composition, and relevance.

Existing Web Search Engines

Figure 1:
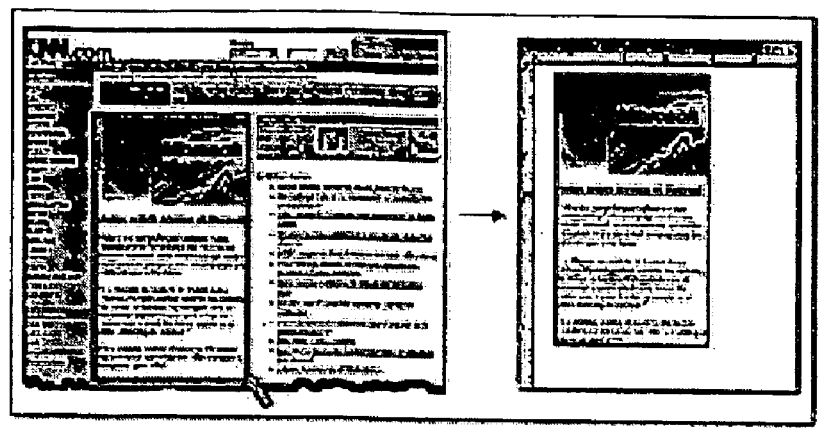
FIG. 1 illustrates one embodiment of how a user uses a graphical user interface to define a view.

Existing search engines have three major components:

A crawler or 'robot' traverses the web by following its link structure and examining the documents encountered.

An indexer builds an index data structure on the contents of the documents, based on a vocabulary, so that documents can be found quickly given queries based on the vocabulary.

A query engine takes queries from users, looks up the indexed structure, and returns the desired documents to the users.

As the number of documents on the web explodes, recognizing the importance of delivering the most relevant information to users, several search engine builders have invested significant effort in the indexer component of their search engines. Their goal is to augment the index data structure with ranking information so that the most relevant documents are given the highest ranking. Ranks are based on the similarity of the query to the document found (based on index information and on where in the document the query terms are found) as well as on the structure of the links (hyperlinks, in the World Wide Web) that connect pages (called the link structure of the web) and/or other properties. We describe two techniques that use hyperlink structure in addition to similarity: PageRank and hub-and-authority. The techniques they use for similarity are, or can be, very similar. We discuss how they use link structure.

The first technique, PageRank, the document-ranking algorithm employed by the "Google" search engine, is a citation-based technique. More specifically, for example, if document A references (links to) document B, then document B receives a fraction of document A's prestige; and this fraction is inversely proportional to the number of documents that document A references. The second technique, hub-and-authority, is due to Kleinberg et al. This method treats an "interesting" portion of the web as a bipartite graph that consists of two kinds of nodes: hub nodes and authority nodes. Hubs are documents that point to many "good" authority nodes, and authority nodes are documents that are pointed to by many "good" hub nodes. A common theme of these techniques is that both exploit the link structures of the web to infer relevance ranking. In both cases, an iterative calculation of the transfer of prestige among pages via their link structure results in link-based rank numbers, which are then combined with similarity to the query to determine the final ranking of pages. Experiences show that these indexing techniques have better success at returning the most relevant documents to users than do approaches that use only similarity to the query but not the link structure. Other search engines use other metrics to determine relevance (in addition to similarity), such as the number of times a particular page is clicked on when presented as a search result, the amount that the owner of a page is willing to pay for the page to be ranked higher, etc.

Some Inadequacies of Existing Search Engines

Most existing web pages (or, more broadly, documents with markup language) are authored for consumption on desktop computers where users typically enjoy generous display and networking capabilities. On the other hand, there are many situations in which one wants to access, and therefore to search for, smaller portions of a document (or entities related to these smaller portions) than the entire document. For example, many wireless devices are characterized by limitations of small screen real estate and poor network connectivity. Browsing an existing web page as a whole on such a device is both cumbersome (in terms of navigation, e.g. if only some content near the bottom right corner of a web page is desired) and wasteful (in terms of the demands placed on network connectivity).

Thus, despite the sophisticated ranking techniques described above, existing search engines are ill suited for the variety of networked devices (especially wireless devices) that are becoming increasingly prevalent and important. The fundamental problem is that the existing document or page granularity, which is the granularity of the information returned by existing search engines, is inappropriate for these devices. "Transcoders", programs that automatically transform existing web pages for consumption on wireless devices (by, for example, reducing the resolution of images or altering the font or format of text) do not provide a satisfactory solution. This is because they do not alter the granularity of existing pages, so end devices are still flooded with information that overwhelms their display and networking capabilities and leads to a poor user experience.

There are many other applications of searching for small clips or objects rather than whole pages or documents. For example, even for desktops, there is increasing interest in viewing clips of information from web pages or web application interfaces rather than whole web pages, either aggregated together as a portal or a 'window to the web' or individually, so searching for small clips can be important in this context as well. Collections of clips or objects may be aggregated for display on much larger displays as well, such as wall-sized displays. Small clips or objects are also increasingly extracted from web pages or their underlying applications and made available over the web to a corporation's partners or clients. These components of content or of business functionality, increasingly being known as web services, are made available over web protocols via links, and may be searched for by a search engine of objects as well. These objects do not have to include content in a markup language, but could be composed of executable code as well.

Opportunity for a Solution

Of course, the granularity mismatch mentioned above is by no means uniquely associated with search engines—it's a more general problem associated with delivering web content (including application interfaces) via a variety of channels (small devices, portals, web services etc.). However, a search engine has some unique characteristics that make the problem particularly relevant and exposes some particular opportunities for addressing it:

Goals: from a user's perspective, search engines should have the mandate of returning the most relevant information, not the most relevant page, so it is important for a search engine to return this information at the appropriate granularity for the device or situation;

Means: search engines possess rich information about link structure that can be exploited when one attempts to find the right information at the appropriate granularity;

Interactions: search engines are part of the web infrastructure, so they have rich opportunities for deriving useful hints from other components of the infrastructure, such as transformation engines for wireless devices.

Key Questions Addressed by Our Invention

In summary, we highlight three key questions that existing search solutions fail to address adequately for a variety of applications:

What is the right granularity at which information is returned for a query? A traditional answer is page granularity, an artificial unit that is ill suited for most wireless devices or some of the other applications mentioned earlier.

How do we transform existing page-granularity information into the information at the appropriate granularity? A traditional answer is to simply "zoom into" the parts of the document that seem to contain the right keywords or patterns. This solution is not particularly content-aware in that it fails to take the semantics or the structure of the page into consideration.

Even if the relevant entities at the appropriate granularity are obtained somehow, how do we rank the target information (objects or entities related to objects) using link structure if the target information is not processed at page granularity, given that links point to whole pages? A straightforward approach is to have the entities simply "borrow" the ranking of the pages from which they are extracted or to which they are related, which an inaccurate approximation at best for many cases and an inappropriate one for some types of entities.

DETAILED DESCRIPTION OF THE FIGURES

In this section, we first explain what views are. We next describe how to obtain fine-grained objects by applying views. We then describe how views participate in the object relevance ranking and querying, and how pages for which views have not been defined are incorporated in the search engine.

Defining "Views"

A "view" is a content-sensitive filter that specifies which sub-part(s) of a larger collection of data a user is interested in. As filters, views are metadata; that is, they are not necessarily themselves the data that the user is interested in obtaining (e.g. viewing from a device), but are applied to existing data (web pages or other collections of content or data) to obtain the desired data. Views can be created and represented in a variety of ways.

FIG. 1 shows an example of how a user uses a graphical user interface to define a view, in this case including a single clip or object on a single web page. (Composite views that specify multiple clips from the same or different pages or web sites are a natural extension and they use natural extensions of the methods; these, as well as other types of ways of specifying and extracting views are discussed later.) In this example, the user highlights a rectangular clip of the CNN home page that corresponds to the current "cover story." This rectangular clip is then transferred to working-area window that might represent the destination display (see right hand side of the figure) and that shows how this clip looks, either in isolation, or as a part of a collection of other similarly defined clips. Alternatively, a view could be specified in some other form of metadata (e.g. pointers to delineating tags in the markup language, patterns and delimiters, or a variety of other forms), including a computer program or module of a computer program that takes the page(s) as input and processes the page(s) to extract the desired object from within it.

In its most generic form, a view refers to one or more documents and provides a mechanism for extracting a subset of those documents. The selection could be specified by data values that identify the relevant portion (either by specifying the relative location of the subset within the document or through enumeration schemes that list the elements of the subset in a possibly compressed form). Alternatively, one could use a sequence of operations or instructions to specify how to extract the relevant subset. Some combination of these two techniques could also be used to define the view. However it is defined, a view can also include some program code or other specification to performs some transformations on the extracted content to produce new content (see Section 0).

The underlying system simply records the source web page(s) and the some information (metadata) that delineates the parts within the page(s) that constitute the view. We call the database that holds the views the view repository. This repository may be centralized or distributed (or a hybrid of the two), even distributed among the computers of the users who define the views. The repository can itself be searched or browsed by view name/label or by the relevant content in the source pages on which the views were defined, resulting in a search engine. However, this is a narrower interpretation of a search engine of objects than is described in this invention. (If part of the repository is distributed among users' computers or storage disks, peer-to-peer technologies such as those used in Napster and Gnutella can be used to share or search these views.)

Many people and organizations, including (but not limited to) end users, employees of corporations and of intermediaries like wireless carriers or internet service providers, makers of web-enabled devices, content providers, third-party service creators, enterprises, and e-businesses, may have an incentive to participate in the creation of a rich collection of views because a) views help provide a more satisfying experience for the wireless web by delivering the most relevant clip to the multiplicity of channels discussed earlier, and b) a graphical user interface makes the view definition process easy even for unsophisticated users. The more the views available, the richer the database of the search engine that may be created.

Object Extraction and Collection by Applying Views

We have explained what views are, why they are useful, and how they are defined. We now show how views are applied and how they can also contribute to a search engine for fine-grained objects. Recall that in a traditional search engine, the granularity of information that is being crawled, indexed, and searched is a page. Views are one mechanism that allow a search engine to process information at a meaningful finer granularity.

Figure 2:
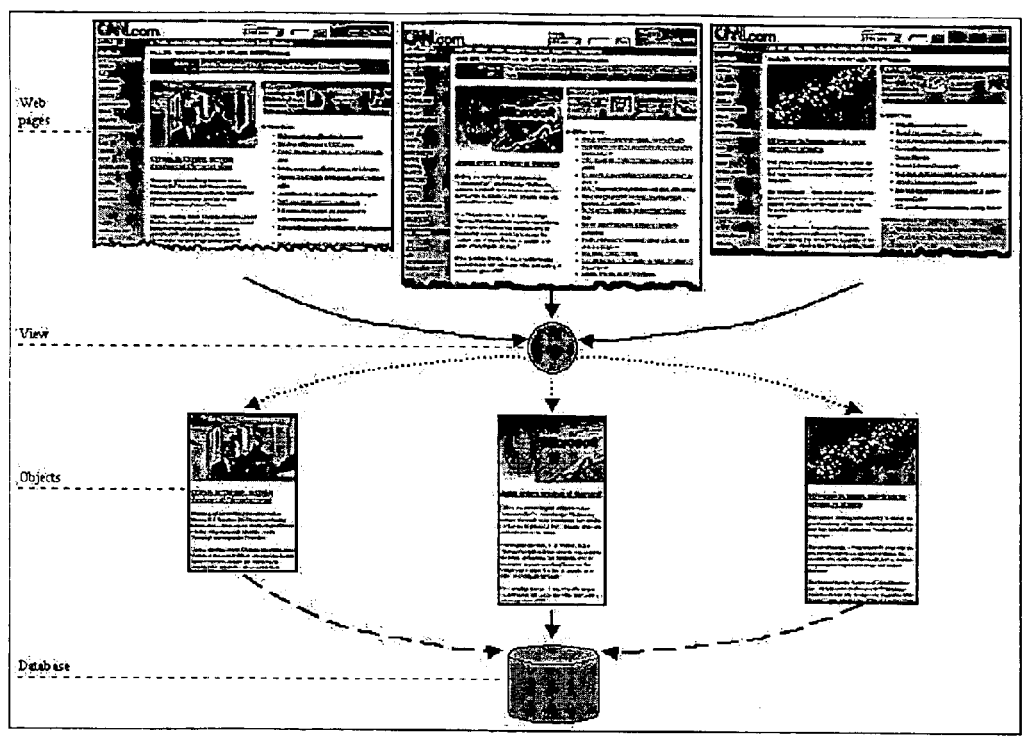
FIG. 2 illustrates one embodiment of collecting and extracting web objects for indexing by applying views.

FIG. 2 continues the example that we have started in FIG. 1. In FIG. 2, the previously defined "CNN cover story view" is periodically applied to successive versions of the CNN home page as it evolves over time. This process is called view application. One of the keys to the success of view application is a robust algorithm that can identify the desired portions specified by the view even as the target web pages change in terms of both content and structure. A variety of methods can be used here, from simple pattern matching to simple traversal of a tree that represents the document to find similar paths, to arbitrarily complex rules based on structure and content that can be defined as part of the view and applied to the new page to extract the desired object. We have also developed some new algorithms for applying views and extracting objects robustly as pages evolve in content, structure and name. We base our algorithms on three observations:

Although pages evolve, in the vast majority of the cases, the changes are gradual and the commonality in terms of both content and structure of the original and new pages can be exploited to isolate the desire clip.

The problem of identifying the desired new clip in a new page given an old page and an old clip may be viewed as a specific instance of the more general problem of finding the shortest edit sequence to transform a source string to a target string.

The strings that represent web pages have a syntactic structure imposed by the syntactic rules of the source markup language.

Even when the given web page to which a view is to be applied has a different name than the web page on which the view was defined, it is possible by examining the structure of the pages to determine which pages that have views defined on them are most similar to a given page.

As examples, we briefly discuss three algorithms that, given a type of view that is defined by a web page (or a document containing markup language) and a selection within that document, can be used to extract objects from related web pages. These algorithms (and their hybrids, see below) as well as others are incorporated in our view extraction system. All these three algorithms start by building two abstract syntax trees (ASTs), one each for the old and new pages.

Tree traversal is the simplest algorithm. It identifies the path in the old AST leading to the root node of the desired old clip. It then traverses the same path in the new AST to locate the new clip. In the common case where there is no structural change in the AST leading to the desired node, this algorithm is the fastest of the ones described here, but the least powerful in dealing with changing or evolving pages.

Linear difference is the intermediate algorithm. It assigns different weights to different nodes of the ASTs, for example to differentiate upper-level nodes from lower-level ones and to differentiate structural nodes from ones that represent content. Intuitively, this transformation is necessary because a web page is not just an arbitrary string and we must "annotate" the string to take its structure into consideration. After completing the weight assignment, we transform both the old and new ASTs into canonical linear representations and apply a known algorithm to find the shortest edit sequence. The portion of the edit sequence that is relevant to the old clip specifies the new clip. This algorithm is more robust than tree traversal because it can tolerate structural variations and it also takes content into consideration. Its running time is quadratic in the number of tokens in the linearized tree. Its disadvantage is that in some cases, applying the relevant portion of the resulting edit sequence to the old clip may not result in integral or structurally sound web page components because the structural information is lost when we linearize the ASTs.

Tree difference is the most sophisticated algorithm. Instead of finding the shortest edit sequence between two linearized ASTs, this algorithm uses modifications of a known algorithm that finds the shortest edit sequence between two trees. This algorithm is even more robust than linear difference because the structural information is retained throughout the entire process. The disadvantage is its expensive running time: it is proportional to the fourth power of the number of nodes in the worst case. A series of optimizations allow us to improve its complexity to $O(N^2 \times h)$, where N is the number of nodes in the AST, and h is the height of the tree.

Hybrids of the three algorithms are also attractive. For example, an algorithm can begin by walking down the tree from the root. If at any level of the tree it detects a circumstance that seems like it might make a simple tree traversal method fail (for example, the number or nature of the children at that level is different in the new tree than in the old tree), it can resort to a difference algorithm at that level of the tree to determine which child to traverse next in its path. Alternatively, a difference algorithm (linear/flat or tree) can be applied at every level regardless, to guide the tree traversal to the correct child at each stage, which is a robust way to bring content as well as structural information into a sophisticated tree traversal. If the tree difference algorithm is used, this level-by-level approach is much less expensive than a full tree difference algorithm that compares all pairs of sub-trees, since the size of a sub-tree and hence the cost of a tree difference algorithm shrinks quickly with levels down the tree. If the linear difference algorithm is used, performing a linear difference algorithm at every level as in this hybrid approach is at most twice as expensive as doing linear difference algorithm on the pair of pages once, but by using the tree structure it avoids the 'potential lack of structure' disadvantage of the original linear difference algorithm. Other hybrids of the algorithms are also possible and are used by our system to extract objects using these types of views.

A number of approaches make the extraction mechanism described above highly robust in the face of various degrees of evolution in page structure. First, each of the above three algorithms has a natural definition of a success metric built in (for example, the edit sequence between the selection in the old page and the new page). As a result, we can take advantage of all three in practice-we start with fast but simple algorithms and move onto slower but more powerful ones if the metric from the simpler algorithm indicates a likely failure. Second, a long time gap between the definition of a view and its application may allow the target page to experience several generations of structural change, the cumulative effect of which may become too complex for any of the three above algorithms to succeed (because the object extraction algorithms are more likely to succeed when the difference between the old and new pages is less drastic). To cope with this challenge, as our system periodically polls or accesses the target page of a view, it refreshes the view definition by applying the object extraction mechanism and storing the fresher version of the page and its clip in place of the old view, allowing the system to adapt to incremental changes smoothly instead of allowing gradual changes to accumulate beyond the system's ability to recognize them. Third, while simply refreshing the view definition as described above is sufficient for some pages, for others this technique may need to be extended to maintaining a certain amount of page format history. For example, for a page that is presented in one of a few formats that it switches between (e.g. a news page that usually appears in one format but to which news flashes are sometimes added and then later removed), keeping a history of view definitions based on these different formats allows our system to perform object extraction efficiently and accurately using the most appropriate definition.

These algorithms and approaches are simply examples of how objects or clips may be extracted using views of this particular type (i.e. views defined by an old page and a selection of a subset of data from it). As mentioned earlier, views can be defined in other ways, for example as rules (together with or independent of an "original" or reference document) or as program code, and may be applied to existing web pages or other documents, data structures or applications to extract objects of interest (or perform transformations on them). Different algorithms may be used to extract from different types of documents or sets of data as well.

A Search Engine of Objects or Views

The view application process can be invoked whenever a user or another application accesses a view from one of the access channels (e.g. a mobile device or portal). Every time a view application is invoked, the result of this view application process is an object (simple, composite or sequence). In addition to providing this object to the user or application that requested it, the object that can be fed into an object database or a repository of objects, which can be indexed and then searched (like the view repository can). Later objects corresponding to application of the same view may either replace earlier objects, or be stored in addition to earlier objects, depending on the choices of the search engine administrator (see discussion below).

In addition to applying views and storing the resulting objects when a user accesses them, views can be scheduled to be applied on an automated basis by the system. The frequency of the application may be specified explicitly or determined by the frequency of the updates observed to the source data or page. The object collection or view application engine then accesses the relevant pages and applies the views on this scheduled basis. Again, the objects that results from these applications can be fed into an object database. The result of these object collection methods, either upon access by users or by the system periodically (on a scheduled basis) or by some other means is a continual stream of fine-grained objects that are fed into an object database, which can be indexed and then searched.

We also note that the process of repeated application of a view on a frequently changing page could be used to improve the accuracy of the extraction process. The object that is obtained from applying a view on a page could be used to update the view defined on the page. Since a view definition comprises of a document and a way of extracting a specific piece information from the page, the extraction process would benefit from a more recent copy of the page and a way of specifying the target information embedded in the recent copy. Consequently, repeated applications of the view application engine on a page results in updated views and a more robust extraction process.

Objects can also be obtained from crawling the web. As pages are encountered, either known views or views defined on pages that are deemed to be close enough to them in structure (see the discussion of 'wild-card views' below below) may be applied to them and the resulting objects fed into the object database if they meet a matching quality criterion (based on edit sequence, for example). In this scenario, views are useful in many different ways. First, the predefined views serve as a means for identifying whether a newly crawled page is similar to a page that has been processed earlier. It therefore acts as a "matching set" to which newly crawled pages could be compared with. Second, if a successful match is identified, the matching view serves as a template for extracting objects (subsets of the markup language document), which are then fed into the repository. Third, a view could also be used to control the crawling process itself. The user could specify that only those links that are present in a pre-specified section of the page need to be explored to discover fresh pages of information. In this scenario, when a page is fetched and a matching view is found in the repository, the view application is performed before generating a new set of links for the search engine to insert into its crawl mechanism. A view therefore provides a complete solution for filtering, extraction, and discovery of objects.

At this point, it would be worthwhile to describe a few example scenarios that illustrate the power of a crawler that employs the above mechanism to extract objects from newly discovered pages. One interesting example is the application of this mechanism to product pages maintained by a site such as Amazon. The crawler could be repeatedly invoked on the main Amazon page, which would have links to new/popular product pages. As the crawler uncovers these pages that have not been processed before, it invokes the appropriate set of views required for extracting product-specific information while ignoring the rest of the contents in the page that might be superfluous. Similarly, one could define a "story view" for news stories that performs the following filtering operation: when given a news story page, it extracts just the title of the story while ignoring the contents of the story as well as other pieces of information on the page that are not related to the news story (such as advertisements). One could then invoke this view on newly crawled pages obtained from a news site such as CNN or a news-feed site such as Reuters. We now have developed a mechanism for both uncovering new sources of information as well as extracting the useful contents from them.

When a page is discovered and a matching view for that page is found in the repository, schedules may be established for repeated application of the view to the page as it evolves. The schedule or frequency of application may be specified by an administrator/user or automatically by the system via a period of trial and error to discover how often that page changes. All of these repository-filling techniques can lead to a large number of objects entering the object database or repository. These include objects from a variety of sources and objects obtained from the same source over time as the source changes.

Note that when the source pages or data and the views are accessed in order to extract objects, the order in which the pages are accessed and the views are accessed does not matter. Any sequence of accesses that ensures that the needed data for extracting an object are present when the object is extracted is appropriate. Even when pages are crawled and views are examined to find a relevant view for a page, the order in which the entities are accessed is unimportant as long as the needed data for extracting an object are present when the object is extracted.

Objects may contain metadata of various types (for example, the views from which they are derived, when they were extracted, upon whose request were they extracted, when the source pages from which they were extracted were generated, information about related objects and views, etc.). Views too may contain metadata of various types that relate them to objects, other views, users, and time. This allows queries to be made across views and objects, using both repositories or only one at a time, and supports a much richer set of queries as discussed in another section.

The results of searches in this overall database of objects and views are either objects/clips or views. Of course, an object could be a whole page, either because the view is defined that way or because no view is applied to the page but its entire contents are fetched into the object repository. Note that within this framework we have not forced a number of orthogonal decisions. For example, an implementer of this scheme can choose whether or not to physically save the objects in the database or simply to discard them after indexing—if they are not saved, the system can re-compute the objects by reapplying the views at query time as long as the page from which they were extracted is still available. As another example, an implementer can also choose whether to index the contents of older objects that have been replaced by new ones (e.g. when a view is repeatedly applied to pages with changing content). If older objects are indexed, then the implementer may or may not need to save the older objects, depending on whether the original web site makes the older pages accessible after their replacement. Note that indexing and/or saving older objects leads to a search database with history or archival properties, which is attractive for many kinds of content (e.g. news, where the database will now be able to return not only the latest cover story, for example, but all cover stories from the past that are relevant to the query).

Like the view repository itself, this object database may be centralized or distributed. If portions of it are distributed among many locations, such as in the personal computers of users of the views—who may have several reasons for saving the actual objects locally, not just the views, such as building personal archives or accumulating news automatically over time to return to examining it later—peer-to-peer or other sharing and search technologies (such as those employed by Napster and Gnutella) can be used to search these portions. Similar peer-to-peer technologies can be used to share and search views in the view repository itself.

Generalizing the Definitions of Views, Objects, and Search Engines

So far, we have presented the concept of view definition, object extraction, and object collection in the context of extracting a singe fine-grained object from its enclosing page. The definitions of views and objects, of course, can be much broader.

First, a view can be a composite view that contains a number of sub views, each of which specifies a clip from a page in the manner described above. In fact, these sub views need not even belong to the same enclosing page or even the same web server or site. As a result of applying these composite views, the object collection process can build composite objects that are made of smaller objects. Our search engine method can return composite views and composite objects as well. We shall include composite views under 'views' and composite objects under 'objects' in our discussion. This means that composite views/objects may be searched for and linked to or from just like simple views/objects.

A view can also be an experience or a sequence of views linked together or strung together somehow. The views in a sequence are likely to be closely related to one another, and often to together accomplish a task that is of interest to a user. For example, buying a book on an e-commerce web site like Amazon.com takes several steps, and requires a user to visit and interact with a sequence of several pages, each reached by taking an action (clicking on a form submission button or other link) on a previous page in the sequence. A version of this experience (for example for access from small-form-factor devices) may be created by defining views on each of the pages or types of pages involved in these steps (for example, a view for the search box on the first page, a view on the results from the search that appear on the next page in the sequence, a view on the price information that appears on the next page when one of the books is clicked on, etc.). The resulting views form a view experience that one may go through from a device, portal or other channel. The application of a view experience on the source pages leads to a sequence of objects, one from each page in a particular experience (e.g. in buying a particular book). We shall include 'view experiences' under views and the objects that results from applying view experiences under objects in our discussion. This means that views/object experiences may be searched for and linked to or from just like simple views/objects, enabling a much more powerful and functional repository and search engine.

In order to support these kinds of view experiences, the system allows the user to perform the steps corresponding to a sample experience using the view definition GUI tool. At each step of the experience, the user not only interacts with the page to make further progress through the transaction, but he/she also makes a selection on the markup document regarding what subset of the page needs to be chained with the previously defined views within the experience. Once a view experience has been defined by the user, it can be invoked repeatedly by the wireless search engine to mine a collection of interconnected pages for relevant information. We would like to observe that the use of a GUI allows even a naïve user to generate these view experiences. This approach is much simpler when contrasted with systems that require the users to specify rules for extracting the relevant subset enclosed within a document. The substantial increase in ease of use through the application of this GUI tool is a fundamental strength of our system.

Second, so far we have defined views as being applicable to fixed pages that are identified by fixed URLs. The second generalization allows for a wild-card view, a view definition that can apply to multiple pages with different URLs but identical page formats. For example, the URLs embedded in the CNN home page change continually. A wild-card view defined for the page pointed to by one of these changing URLs is also applicable to all other "similar" pages that exist then or will exist in the future. Given an arbitrary page, the challenge is to identify the wild-card view(s) that may be applicable to it. A wild card view does not have to explicitly identified as such, but is one that gets applied to a page that has a different URL from the page on which it was defined.

Another way to look at this problem is that often a page may be accessed and may have a URL or name on which no view is defined (e.g. every new detailed news story page that appears on CNN has a different URL and will likely not have had a view defined on it). When such a page is accessed, the problem arises to find a page that is similar enough to the page that is being accessed and that has a view defined on it, so that that view may be used. The candidate pages or views for a page or type of page may be identified, or all views defined on pages from that site or domain, or all views (and hence pages) in the view repository may have to be examined. The problem is to find the 'most similar page' to the page being accessed.

Our system uses a combination of three approaches to solve this problem:

The URL-based approach compares the URL of the original page that defines the view to the URL of the arbitrary new page. If the two URLs "match", for some definition of a "match", such as a longest prefix match or a regular expression match, we declare the view to be applicable to this new page.

The AST-based approach names pages not by their URLs, but by their (partial or full) ASTs or a concatenation of the AST paths, each of which identifies a tree node within a page encountered during a hypothetical navigation session from a root node. So even when URLs change, ASTs or AST navigational paths can be used to identify the applicable view(s).

The structure-based approach examines the syntactic structure of an arbitrary page and calculates a checksum that is used as an identifier for an applicable view.

Experience views and wild-card views can be used in tandem to obtain a very powerful data extraction tool that allows an automatic search engine tool to obtain information from a collection of sources of information. Each source could now be a set of web-pages that are related based on the information that is described within them. For example, Amazon provides a set of pages for each product with each page focusing on separate topics, such as product details, customer reviews, and buying information. Information from such a set of pages could be obtained by the application of an experience view. However, an experience view that was originally defined on the pages associated with a certain product would not be directly applicable to pages corresponding to a different product. Fortunately, one could employ wild-card views to overcome this limitation. In fact, when view experiences are used along with wild-card views, it eliminates the need for explicitly linking the various steps of the view experience. Instead, a view is defined at every step of the experience during a sample interaction, and during a different interaction, the same view experience is implicitly re-invoked through the applicability of the defined views in a wild-card fashion on the newly fetched pages. This scheme allows for more flexible experience chains as it eliminates the need for hardwiring the order in which one invokes the various steps of an experience. The resulting merger of these two techniques enables the deployment of search engine that mines a large collection of sets of related pages without requiring substantial user specification.

The third generalization of the definition of a view allows it to be an arbitrary piece of code that performs some computation and transformation on source objects and produces derived objects. As a simple example, a view can take the train schedule listing from the New Jersey Transit web site and compute from it the next three trains from station X to station Y after the current time. As these derived objects become first-class citizens of a search engine, they in turn lead to an ultimate generalization of a search engine-a search engine can now search for not only what is out there, but also what can be done with what is out there. Code or other mechanisms (like stylesheets) may also be used to transform the extracted object into a form more applicable to a particular client device (for example, using transcoding for wireless devices). This translation or transcoding may be specified as part of a view in some cases. All of these types of views and their resulting objects may be part of the search engine's database of views or of objects.

Object Extraction through Auto-Snippetization

So far, the description of our fine-grained object search engine is based on user-defined views of various kinds. It may also be important for a search engine to return information (objects or clips) from pages that do not have views associated with them or with any related enough pages to be satisfied by the methods relating to "wild-cards" discussed in another section. We refer to this task of automatically generating snippets or clips from pages that do not have any predefined applicable views as auto-snippetization.

To include such pages in the repository, in addition to searching views and view-defined objects in the database, our system first finds a number of relevant pages using a regular web search engine for pages. It then breaks the pages down into smaller objects based on their structural and presentational attributes. This process of breaking up a page into chunks begins with the task of identifying the important text-items. We will refer to these text-items as headers. Headerness calculation is the process of finding how likely a particular text node is to be a header. Many pieces of information, including structural and visual cues present in the page, are analyzed in the process of identifying these headers. Once the headers have been identified, a header and its associated text define a portion of the page that has a high likelihood of being a logically and semantically cohesive unit. To be more concrete, the process of auto-snippetization therefore involves the following steps:

1. For all the text elements on a page, identify visual cues, such as the coordinates and other features like size, background color and text color.
2. For each text element, try to figure out how likely it is to be a header using the structural and presentational attributes inferred from the previous step.
3. For each potential header, identify the text associated with the header. We again use structural and presentational attributes of the target page to determine this.
4. Identify a set of headers that are necessary to cover the whole page with its associated text items. Each of these "necessary" headers along with its associated text is a snippet that is likely to be an object of appropriate granularity.

It is interesting to note that both structural and presentational attributes play a role in automatically decomposing a page into snippets. The structure of the page is used to impose a variety of constraints on the generated snippets. For example, we would like to enforce the restriction that snippets are likely to span only a contiguous range of structural items such as lists, tables, and table cells. Similarly, it is likely that a semantically cohesive unit spans a physically contiguous region on the rendered version of the page. In addition, information from the rendered version of the page could be used to incorporate a variety of useful heuristics. Headers are likely to be spaced out in regular intervals and tend to have a similar look and feel on a given page. Our algorithm employs these heuristics to generate a credible set of candidate headers and their associated text-items.

The search engine will then return objects at an appropriate granularity based on relevance per unit size as well as device type and capability. Compared to objects generated by applying user-defined views, one disadvantage of these automatically generated objects is that they do not necessarily possess a user-friendly look and meaning. The advantage of including these objects is to provide comprehensive coverage, since not all pages may have views defined for them, ensuring that our object-based search engine is no worse than a conventional one in this dimension as well.

Architecture of a View-Based Web Object Search Engine

Figure 3:
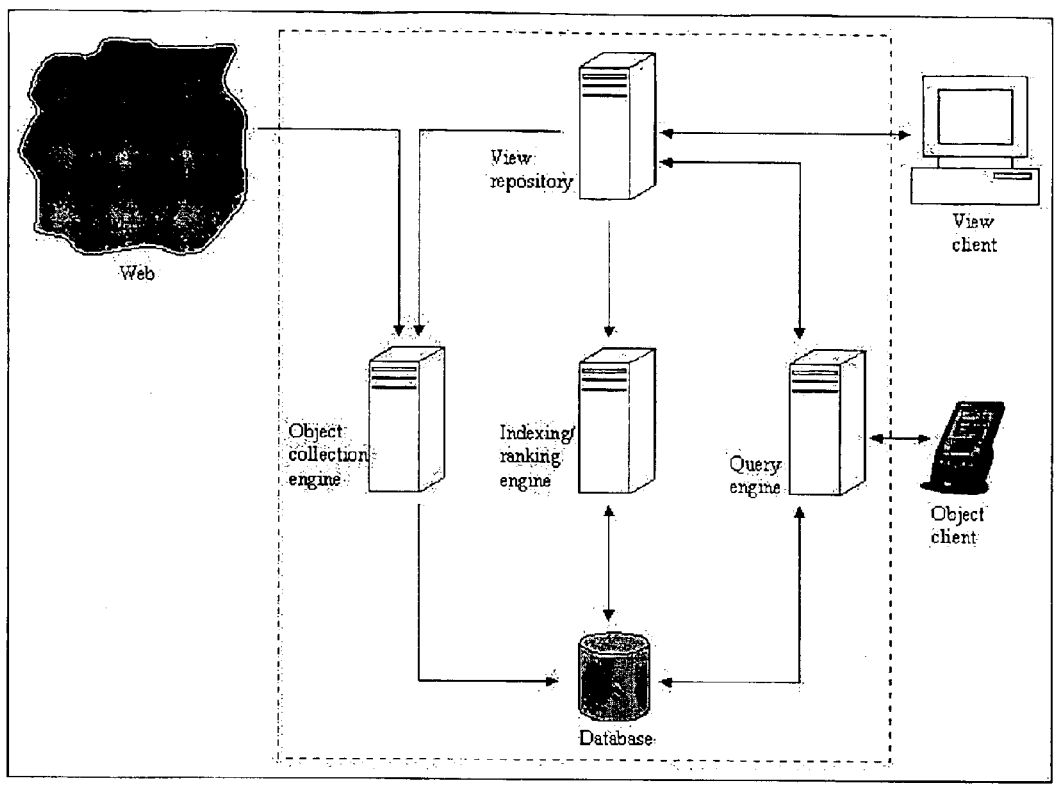
FIG. 3 illustrates one embodiment of architecture of a view-based web object search engine.

Now that we have described how user-defined views can provide the basis for a fine-grained web object search engine, we show a possible overall architecture of such a search engine (in FIG. 3). The components within the dotted box constitute the search engine. So far, we have described the roles played by the view repository and the object collection engine. We now examine the remaining components and how they interact with the view repository. The figure shows the clients, the view repository/database, the object database/repository, the sources of the data (encapsulated in the "web" in the figure) and the various engines as being different machines connected by a network. However, it is certainly possible that two or more of these entities be the same machine or run on the same machine. For example, the object collection engine that applies views can run on the web server that provides the source page. Or all the engines can run on the same machine, or all the engines and repositories. Any combinations of the different pieces of software and storage running on the same machine or on network-connected machines is possible, though scenarios in which some of the processes run on different network-connected machines are most likely. As discussed earlier, the object and view repositories or databases can themselves be distributed to small or very large extents.

View-Based Object Relevance-Ranking

A key to some of the more successful relevance-ranking algorithms in existing search engines is to take link structure into consideration together with the similarity of a page to the query (the similarity being measured in a variety of possible ways). In a nutshell, pages that are more frequently linked to by other important pages tend to be more important, and importance combined with similarity leads to an overall relevance score. The views and objects that our search engine may return are not native to the current web but are applied to and derived from resources (pages) in it. So there are not inherently in the current web links to views and to fine-grained objects or clips within pages. Since link structure and importance-based ranking has been found to be valuable for web pages, we would like to use such an approach for views and objects as well in our search engine. A straightforward approach would be to have an object inherit the importance(s) of the page(s) from which it is obtained and a view inherit the importance(s) of the page(s) on which it is defined. However, it is not necessarily appropriate for objects to simply "borrow" the importance ranking of these pages. One reason is that, in many cases, the scores given to objects should not equal to those of their enclosing pages. For example, a user could define a "CNN sports section" view by clipping the relevant small part of the CNN home page. The enclosing page, the CNN home page in this case, has a high relevance ranking due to the wealth of other diverse information on it. If we simply rank the "CNN sports section" object as highly as its enclosing page, we may inflate its relevance score beyond what it deserves (other sites may have much higher importance with regard to sports, but not nearly as high importance overall as CNN does). Views and objects may derive some of their importance from the page-level link structure based importance of the page(s) on which they are defined, but it is also valuable to compute link-based relevance at their own granularity itself.

Figure 4:
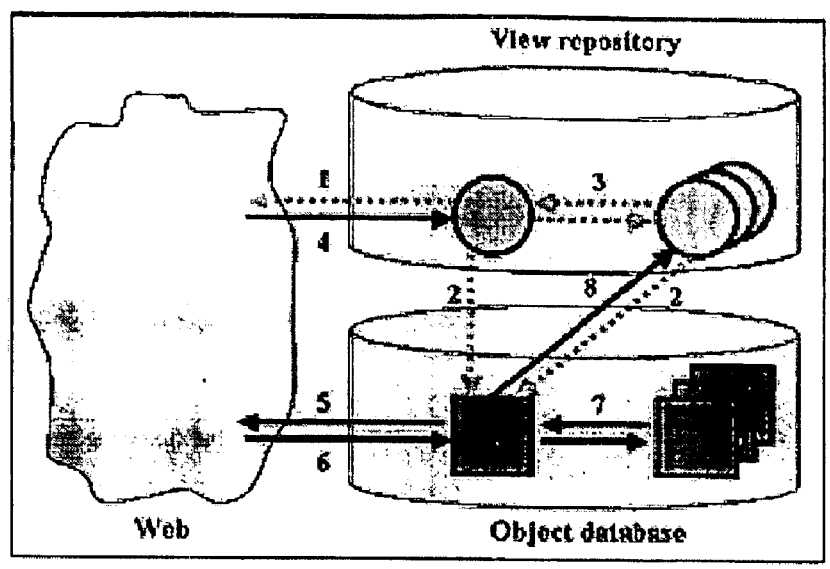
FIG. 4 illustrates one embodiment of components of the web object database graph.

The key to our link-structure based importance-ranking algorithm is to recognize that we now have a potentially much richer link graph. FIG. 4 illustrates the components. A graph consists of nodes and edges. There are three types of nodes in our system: web pages or original documents, views, and objects. There are two types of edges: a definition edge from node A to node B denotes that component A is defined in terms of component B, and a reference edge from node A to node B denotes that there is a hyperlink to component B within component A.

More specifically, FIG. 4 hows that there are many circumstances under which such edges can occur. These are simply examples of some types of edges, and others are possible too. The numbers in the following list correspond to the number labels in FIG. 4.

1. A view is defined in terms of an enclosing web page.
2. An object is defined by a view.
3. A composite view can be defined in terms of other views. Similarly, a view experience can be defined in terms of other views.
4. Web pages reference views.
5. Objects references web pages.
6. Web pages reference objects.
7. Objects reference each other.
8. Objects reference views.

While some of these link types either already exist on the page-based web or arise naturally from view definition itself, note that our system has given rise to two new types of hyper-links. One new type is hyper-links to views (items 4 and 8 above), including composite views or view experiences. For example, a web page can link to the "current CNN cover story view". The second new type is hyper-links to objects. For example, a web page can link to the "CNN midnight cover story on Jul. 9, 2000". In a sense, these links extend the current web to include views and objects as 'first class citizens.'

Once one recognizes the entities of our link structure graph, it is relatively straightforward to extend the existing link-based relevance-ranking algorithms. For example, the PageRank algorithm can be extended to compute PageRank scores for views and objects just as we do for web pages. Only, since there are multiple types of nodes and edges in our graph (instead of just pages and reference hyperlinks to pages in the current web) we may assign weights differently based on the component types. The hub-and-authority algorithm can be similarly extended so that the views and objects in our system become hubs or authorities. The result is that we are able to rank relevance scores of pages, views, and objects more accurately than traditional methods would.

View-Based Queries

The final unexplained component in FIG. 3 is the query engine. One difference between this query engine and that of traditional search engines is that our system allows cross-queries with the view repository, both to search views themselves (rather than objects) by name/label or the content of the pages on which they are defined, as well as to take advantage of the rich semantic and profile data available in the view repository during search. The information could include rich semantic information about the views (e.g. from organizing views into a directory, classification scheme or a richer, multidimensional semantic model) in addition to just keywords and descriptions. It can also include very valuable information about the users who have defined or who use the views. For example, the fact that a user has defined a particular view probably indicates that they are interested in the subject or topic of that view. Such queries, perhaps extended with online analysis, can be used for personalization of search results based on either stated user interests or interests inferred from the views they have defined or that they use, for cross-correlation queries (e.g. what are the top ten views of news that are invoked by doctors), or for targeted advertising.

The objects brought into the object repository may also have meta-information stored with them; for example, the views from which they were derived, the time when they were extracted etc. This also enables richer queries such as "what are objects resulting from the following view(s) or views of the following type (say news) that are also relevant to the following query". Similarly, the view repository may store information that associates view with objects derived from them or other views or objects related to them, enabling a richer set of cross view-object queries as well. Furthermore, objects that were obtained from a sequential application of the different steps of experience view would have sufficient amount of associated meta-data information, and this would allow for identifying collections of related objects pertaining to a certain experience. The query engine would allow the user to gain access to these collections as well.

In dealing with composite objects and views, our query engine computes similarity across views and objects that are associated with multiple pages. Finally, our query engine may also compute similarity based on structural information or descriptions of the objects or views (e.g. structural templates) together with keywords or patterns rather than only based on keywords as most current search engines do.

What is claimed is:

1. A method of searching resources on the web, comprising:
   receiving a search query to search for information on the web;
   accessing one or more web pages and one or more subsets of one or more web pages, the subsets having been extracted from the one or more web pages prior to receiving the search query, the subsets extracted responsive to one or more views, the one or more views defined independently of the search query, wherein the views are content-sensitive filters that specify which sub-parts of a web page a user is interested in;
   prior to receiving the search query, storing the subsets in a database;
   responsive to the search query, identifying at least one of one or more of the extracted subsets of one or more web pages stored in the database, the search query used as a criterion for identifying at least one of the one or more subsets.

2. The method of claim 1, wherein the views are capable of identifying desired portions of the web pages when the respective web pages evolve.

3. The method of claim 1, wherein the subsets include one or more web pages and one or more selections, one or more selections including one or more subsets of one or more web pages.

4. A method of searching electronic resources including markup language, comprising:
   receiving criteria for filtering of data; and
   responsive to the criteria, identifying one or more sequences of a plurality of predefined views that can be applied to one or more electronic documents, the electronic documents including markup language, each predefined view including instructions, the instructions operating on the one or more electronic documents, the instructions specifying methods for selecting one or more subsets of the one or more electronic documents;
   wherein the views are content-sensitive filters that specify which sub-parts of an electronic document a user is interested in.

5. The method of claim 4, wherein the views are capable of identifying desired portions of the electronic documents when the electronic documents evolve.

6. The method of claim 4, wherein, at least one view of the plurality of predefined views includes one or more links to one or more views of the plurality of predefined views, the one or more links allowing at least two of the plurality of predefined views to be accessed sequentially.

7. The method of claim 4, wherein the electronic documents comprise web pages.

8. The method of claim 4, wherein the subsets include one or more electronic documents and one or more selections, the one or more selections including one or more subsets of one or more electronic documents.

9. A method of searching electronic resources, comprising:
   receiving criteria for filtering of data; and
   responsive to the criteria, identifying one or more sequences of a plurality of pre-defined views that can be applied to one or more electronic documents, each pre-defined view including instructions, the instructions operating on the one or more electronic documents, the instructions specifying methods for selecting one or more subsets of the one or more electronic documents;

wherein the views are content-sensitive filters that specify which sub-parts of an electronic document a user is interested in.

10. The method of claim 9, wherein the views are capable of identifying desired portions of the electronic documents when the electronic documents evolve.

11. The method of claim 9, wherein, at least one view of the plurality of one or more predefined views includes one or more links to one or more views of the plurality of one or more predefined views, the one or more links allowing at least two of the plurality of one or more predefined views to be accessed sequentially.

12. The method of claim 9, wherein the electronic documents comprise web pages.

13. The method of claim 9, wherein the subsets include one or more electronic documents and one or more selections, one or more selections including one or more subsets of one or more electronic documents.

14. A computerized system for searching, the system comprising:

a view repository;

a database;

means for receiving a search query;

means for accessing one or more documents and one or more subsets of one or more documents, the subsets having been extracted from the one or more documents prior to receiving the search query, the subsets extracted responsive to one or more views, the one or more views defined independently of the search query and stored in the view repository, wherein the views are content-sensitive filters that specify which sub-parts of a document a user is interested in;

means for, prior to receiving the search query, storing the subsets in the database;

means for, responsive to the search query, identifying at least one of one or more of the extracted subsets of one or more documents stored in the database, the search query used as a criterion for identifying at least one of the one or more subsets.

15. The system of claim 14, wherein the views are capable of identifying desired portions of the electronic documents when the respective electronic documents evolve.

16. The system of claim 14, wherein the documents comprise web pages.

17. A method of searching resources on a network, comprising:

receiving a search query to search for information on the network;

accessing one or more electronic documents and one or more subsets of one or more electronic documents, the subsets having been extracted from the one or more electronic documents prior to receiving the search query, the subsets extracted responsive to one or more views, the one or more views defined independently of the search query, wherein the views are content-sensitive filters that specify which sub-parts of an electronic document a user is interested in;

prior to receiving the search query, storing the subsets in a database;

responsive to the search query, identifying at least one of one or more of the extracted subsets of one or more electronic documents stored in the database, the search query used as a criterion for identifying at least one of the one or more subsets.

18. The method of claim 17, wherein the views are capable of identifying desired portions of the electronic documents when the respective electronic documents evolve.

* * * * *